R. P. COOLEY.
VALVE.
APPLICATION FILED FEB. 24, 1919.
1,422,178.
Patented July 11, 1922.
4 SHEETS—SHEET 2.
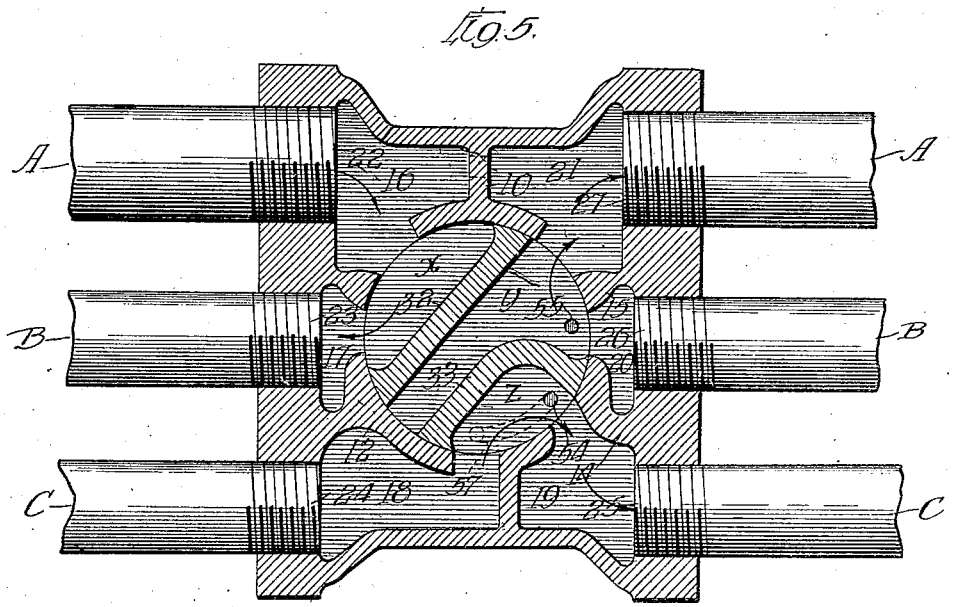

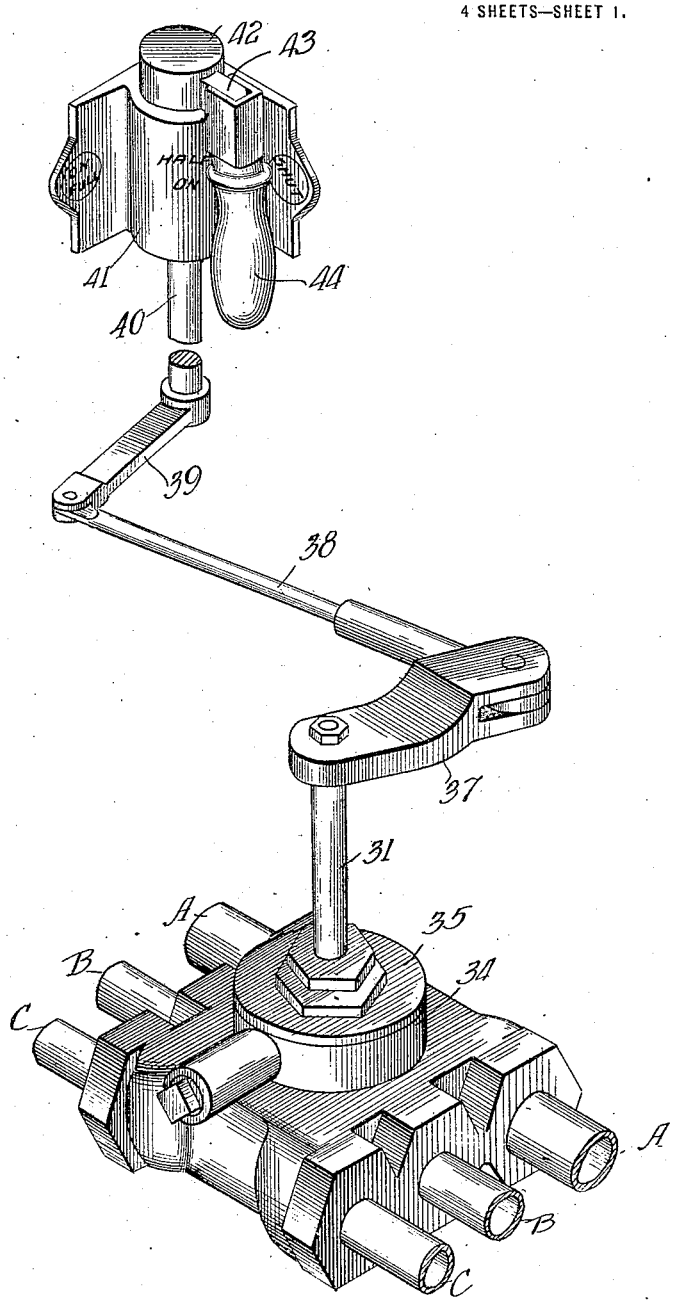

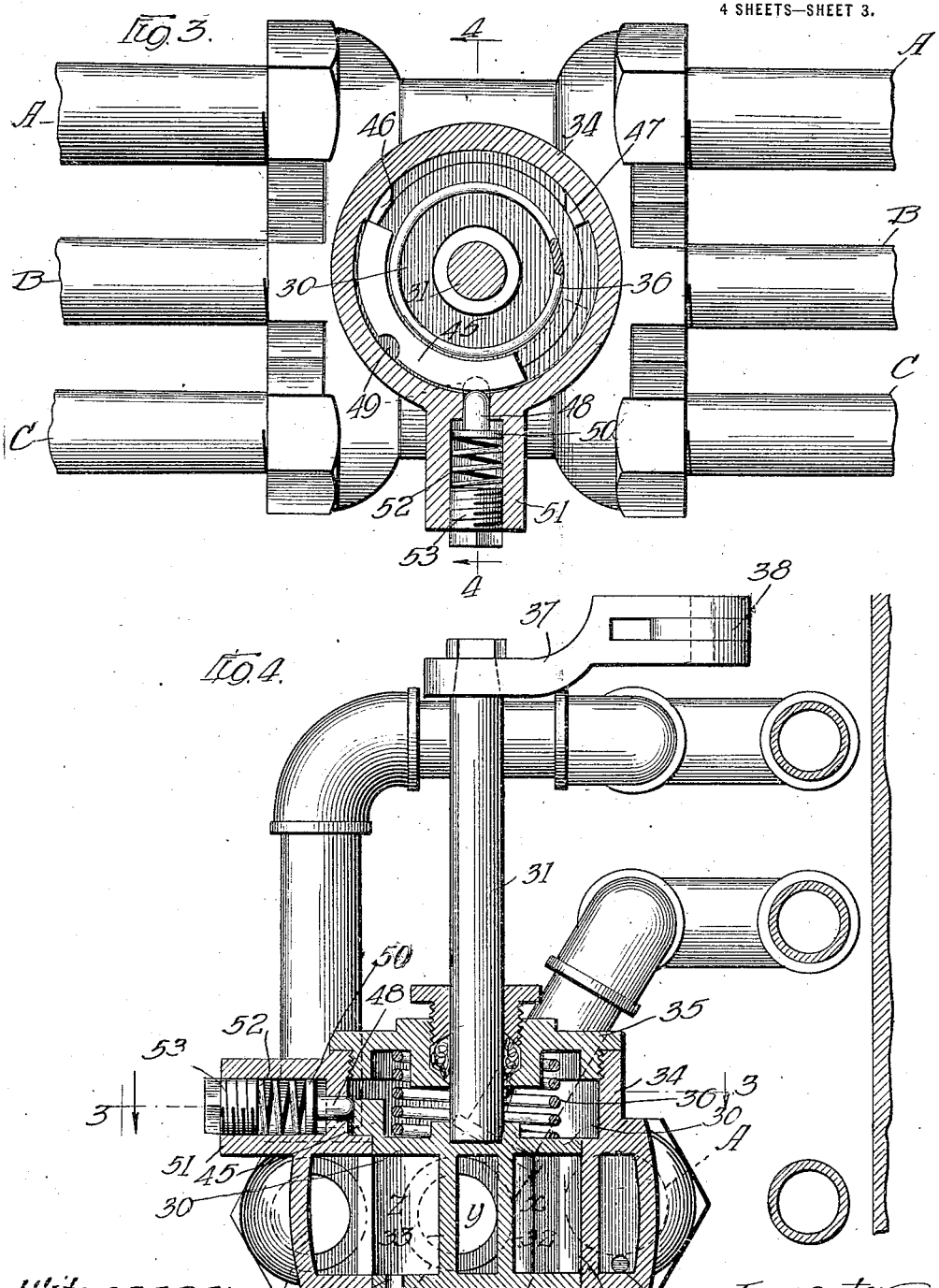

R. P. COOLEY.
VALVE.
APPLICATION FILED FEB. 24, 1919.
1,422,178.
Patented July 11, 1922.
4 SHEETS—SHEET 4.
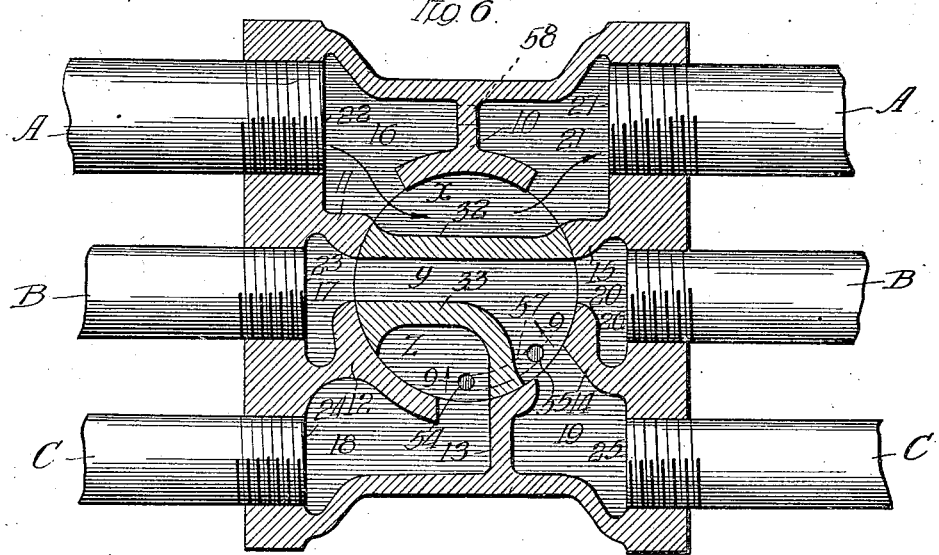
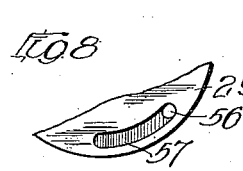
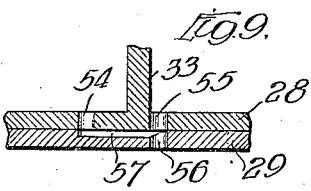
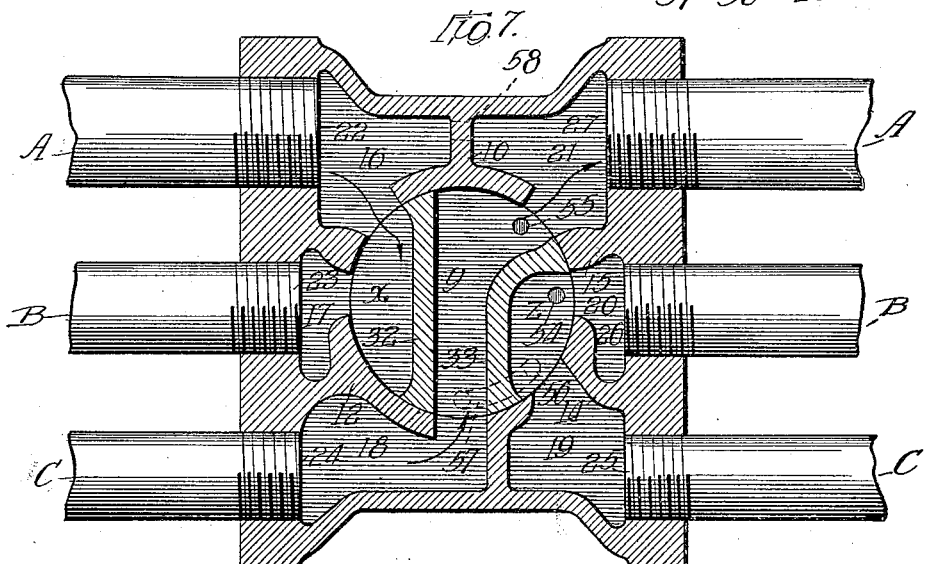

UNITED STATES PATENT OFFICE.

ROSWELL P. COOLEY, OF CHICAGO, ILLINOIS, ASSIGNOR TO VAPOR CAR HEATING COMPANY, INC., OF CHICAGO, ILLINOIS, A CORPORATION OF NEW YORK.

VALVE.

1,422,178.  Specification of Letters Patent.  Patented July 11, 1922.

Original application filed May 11, 1918, Serial No. 233,905. Divided and this application filed February 24, 1919. Serial No. 278,882.

*To all whom it may concern:*

Be it known that I, ROSWELL P. COOLEY, a citizen of the United States, residing at Chicago, in the county of Cook and State of Illinois, have invented certain new and useful Improvements in a Valve, of which the following is a specification.

My invention relates to valves and particularly to a novel construction which may be advantageously used in connection with the heating system for railway cars. The invention was first disclosed in my co-pending application Serial No. 233,905, filed May 11, 1918, of which this application is a division.

One of the principal objects of this invention is to provide a valve adapted to be connected to and control three heating units, a single valve member being employed to selectively place one, two or three of said heating units in operation.

The invention will be more readily understood by reference to the accompanying drawings, in which, Fig. 1 is a perspective view showing a valve such as is contemplated by my invention together with its operating connections;

Fig. 2 is an enlarged perspective view of an operating handle and supporting bracket;

Fig. 3 is a sectional plan view on the line 3—3 of Fig. 4;

Fig. 4 is a vertical sectional view on the line 4—4 of Fig. 3;

Fig. 5 is a transverse sectional view through the valve casing showing the valve member in one of its positions;

Figs. 6 and 7 are similar views showing the valve member in other positions;

Fig. 8 is a fragmentary plan view showing the provision for draining any water of condensation; and, Fig. 9 is a fragmentary sectional view on the line 9—9 of Fig. 6.

The valve herein illustrated is intended primarily for use in controlling the supply of steam to a plurality of radiators. These radiators are indicated generally by the letters A, B and C. The radiator A may be said to be primary, while the radiators B and C are secondary. It is desired in the use of a system of the character to which the valve has been applied, that heating fluid should first be supplied to the primary radiator provision being made, however, for diverting the flow of heating fluid into either one or both of the secondary radiators as desired. Where the invention is employed in connection with a heating system which utilizes vapor or steam at atmospheric pressure, the pipe in the upper right hand corner of Figs. 5, 6 and 7, will be connected to a thermostatic controlling device of the type such as illustrated, for example, in the patent to Gold, No. 987,569, the operation of which is well understood.

The device of my invention comprises a casing which is divided by interior webs 10, 11, 12, 13, 14 and 15 into six chambers 16, 17, 18, 19, 20 and 21. These chambers are provided with inlet ports to which pipes 22, 23, 24, 25, 26 and 27 are connected; the pipes 22, 27, constituting a part of the radiator A, pipes 23, 26, constituting a part of the radiator B and the pipes 24, 25, a part of the radiator C. The pipe 22, constitutes the inlet for heating fluid, so far as the valve is concerned, while the pipe 27, constitutes the outlet or discharge passage.

The valve member comprises a cylindrical member adapted to snugly fit the walls formed by the webs 10 to 15 inclusive and consists of a lower disk 28 which rests on the bottom wall 29 of the valve casing, an upper disk 30 to which a valve stem 31 is rigidly secured and two vertical webs 32, 33, which extend between the disks. The valve member is thus provided with three transverse passages which are designated X, Y, Z.

The valve casing is provided with an upwardly projecting annular flange 34, internally threaded and adapted to be engaged by a bonnet 35, a spring 36 being interposed between the bonnet and the upper disk 30 of the valve member. A gland and suitable packing serves to prevent leakage around the valve stem. To the upper end of the valve stem 31 is secured a crank 37 connected by a link 38 with a crank 39 on the end of a shaft 40 held in a bracket 41, which may be secured to a wall as of a railway car. The shaft is provided at its upper end with a collar 42, provided with a lug 43, to which is pivoted a handle 44.

Projecting upwardly and outwardly from the edge of the upper disk 30 is an arcuate lug 45 adapted to co-operate with stops 46, 47, on the interior of the flange 34. These stops serve to limit the movement of the valve member in opposite directions. For holding the valve member in its intermediate position such as shown in Fig. 5, a locking dog 48 is adapted to engage a recess 49 in the edge of the lug 45. The locking member 48 has a head 50 which slides within a cylindrical projection 51, formed on the valve casing. A helical spring 52, is interposed between the head of the locking member and a screw plug 53 which has threaded engagement with the interior of the cylindrical projection 51.

The lower disk 28 of the valve member is formed with a perforation 54 at one side of the web 33 and another perforation 55 between the webs 32, 33. The bottom wall 29 of the casing, is formed with a perforation 56, as best shown in Fig. 9 and with an arcuate channel 57 in communication therewith. The openings as described serve to permit the escape of water when in communication with the passages through the valve member in a manner more fully described hereinafter. The web 10 between the chambers 16, 21, is preferably provided with a small perforation 58, near the bottom thereof through which the water of condensation from the radiator A is permitted to pass, even though the valve is in a position to direct steam through one or both of the secondary radiators.

In describing the operation of the valve it will be assumed that it is intended to control the admission of steam to three radiators, with the object of admitting heating fluid to either one, two or three thereof.

In the position of Fig. 6 (hereinafter referred to as the "first position") both the radiators B and C are inactive, the steam entering through pipe 22 passing directly through the valve member into the discharge pipe 27. In this position of the valve member both the radiators B and C are in communication with the water outlet 56, by reason of the register of the openings 54, 55 with the groove 57 and outlet 56 respectively.

In the position of Fig. 5 (which will be referred to as the "second position"), the steam entering through the pipe 22 passes into the radiator B through the valve member and emerges from the pipe 26 thereof, then passes through the passage Y of the valve member into the discharge pipe 27 of radiator A. In this position of the valve member the radiator C is inactive and any water of condensation may escape through the apertures 54 and 56 which are in register.

With the valve member in the position of Fig. 7 (hereinafter referred to as the "third position"), it will be seen that steam admitted through the pipe 22 enters the chamber 16 and is directed through the passage X of the valve member into the chamber 17, thence through the pipe 23 representing a coil of the radiator B. After passing through radiator B, the steam emerges from the pipe 26 into the chamber 20, thence through the passage Z of the valve member into the chamber 19, thence into the pipe 25 constituting a part of the radiator C. Any remaining steam emerges from the pipe 24 after passing through radiator C into the chamber 18, thence through the passage Y of the valve member into the discharge chamber 21, thence into the discharge or outlet pipe 27. In this position of the valve member it will be seen that the outlet port 56 for draining is covered, any water of condensation being caused to pass through the valve into the discharge pipe 27.

The operating crank and connections with the valve may be arranged to suit different conditions. The arrangement shown is that which I have adopted for controlling heat in railway cars, particularly railway sleeping cars. In the position of the parts shown in Figs. 1 and 2, the valve member will be in the position of Fig. 6, the other position of the valve being indicated on the bracket shown in Fig. 2.

In certain of the claims hereof I have employed the reference numerals and letters of the drawings to indicate certain chambers and ports. This is done as a matter of convenience and to avoid prolixity, and is not intended to limit the invention to the precise structural features of the embodiment of the invention shown.

I claim:

1. In a valve, the combination of a casing having a plurality of chambers, and a rotary valve member in said casing provided with a plurality of ports and adapted to be set to three different positions in which said ports put said chambers into communication with each other in pairs, differently combined for each position of the valve member, said casing and valve member being provided with drainage ports which come into register when said valve member is in certain of said positions.

2. In a valve, the combination of a casing provided with a central space having six chambers disposed around the same and in communication therewith, and a valve member rotatable in said central space having a pair of webs serving to provide three ports through the valve member from side to side which put said chambers into communication with each other in pairs differently combined for two different positions of the valve member and which put four of said chambers in communication with each other, in pairs, in another position of the valve member.

3. In a valve, the combination of a casing provided with a central space having six chambers disposed around the same and communicating therewith, and a valve member rotatable in said central space having a pair of webs serving to provide three ports through the valve member from side to side which put said chambers into communication with each other, in pairs, differently combined, for two different positions of the valve member and, for a third position of the valve member, put two of said chambers in communication with each other, and another chamber in communication with two more chambers, shutting off the sixth chamber from the others.

4. In a valve, the combination of a valve casing providing three pairs of chambers, 16—21, 17—20, and 18—19, and a valve member arranged to assume three positions putting the valve chambers in communication as follows: for the first position chambers 16 and 21 are in communication and the other chambers are cut off therefrom; for the second position chamber 16 communicates with chamber 17 and chamber 20 with chamber 21, the other two chambers being cut off from these four; for the third position chamber 16 communicates with chamber 17, chamber 18 with chamber 21, and chamber 19 with chamber 20.

5. In a rotary valve, the combination of a valve casing providing three pairs of chambers, 16—21, 17—20 and 18—19, and a valve member formed with three transverse ports, which valve is arranged to assume three positions putting the valve chambers in communication as follows: for the first position chambers 16 and 21 are in communication and the other chambers are cut off therefrom; for the second position chamber 16 communicates with chamber 17 and chamber 20 with chamber 21, the other two chambers being cut off from these four; for the third position chamber 16 communicates with chamber 17, chamber 18 with chamber 21, and chamber 19 with chamber 20.

6. In a valve, the combination of a valve casing providing three pairs of chambers, 16—21, 17—20 and 18—19, those of each pair disposed oppositely, one to another, and a rotary valve member formed with three transverse ports, which valve is arranged to assume three positions putting the valve chambers in communication as follows: for the first position chambers 16 and 21 are in communication and the other chambers are cut off therefrom; for the second position chamber 16 communicates with chamber 17 and chamber 20 with chamber 21, the other two chambers being cut off from these four; for the third position chamber 16 communicates with chamber 17, chamber 18 with chamber 21, and chamber 19 with chamber 20.

7. In a valve, the combination of a valve casing providing three pairs of chambers, 16—21, 17—20, and 18—19, and a valve member arranged to assume three positions putting the valve chambers in communication as follows: for the first position chambers 16 and 21 are in communication and the other chambers are cut off therefrom; for the second position chamber 16 communicates with chamber 17 and chamber 20 with chamber 21, the other two chambers being cut off from these four; for the third position chamber 16 communicates with chamber 17, chamber 18 with chamber 21, and chamber 19 with chamber 20.

8. In a valve, the combination of a valve casing providing three pairs of chambers, 16—21, 17—20 and 18—19, and a valve member arranged to assume three positions putting the valve chambers in communication as follows: for the first position chambers 16 and 21 are in communication and the other chambers are cut off therefrom; for the second position chamber 16 communicates with chamber 17 and chamber 20 with chamber 21, the other two chambers, being cut off from these four; for the third position chamber 16 communicates with chamber 17, chamber 18 with chamber 21, and chamber 19 with chamber 20, said casing and valve member being formed so as to provide drainage ducts from chambers 17, 18, 19 and 20 when the valve member is in the first position and from chambers 18 and 19 when the valve member is in the second position.

9. In a valve, the combination of a valve casing providing three pairs of chambers, 16—21, 17—20 and 18—19, and a valve member arranged to assume three positions putting the valve chambers in communication as follows: for the first position chamber 16 communicates with chamber 21 and chamber 17 with chambers 19 and 20; for the second position chamber 16 communicates with chamber 17, chamber 20 with chamber 21, and chamber 18 with chamber 19; for the third position, chamber 16 communicates with chamber 17, chamber 18 with chamber 21, and chamber 19 with chamber 20.

10. In a valve, the combination of a valve casing providing three pairs of chambers, 16—21, 17—20 and 18—19, and a valve member arranged to assume three positions putting the valve chambers in communication as follows: for the first position chamber 16 communicates with chamber 21 and chamber 17 with chambers 19 and 20; for the second position chamber 16 communicates with chamber 17, chamber 20 with chamber 21, and chamber 18 with chamber 19; for the third position, chamber 16 communicates with chamber 17, chamber 18 with chamber 21, and chamber 19 with chamber 20, said casing and valve member being formed so as to provide drainage ducts from chambers 17, 18, 19 and 20 when the valve member is in the first position, and from chambers 18 and 19 when the valve member is in the second position.

11. In a valve, the combination of a valve casing providing three pairs of chambers, 16—21, 17—20 and 18—19, and a rotary valve comprising upper and lower discs and two webs dividing the valve into three ports, $x$, $y$, $z$, said valve being adapted to assume three positions, putting the valve chambers into communication through said ports as follows: for the first position chamber 16 communicates with chamber 21 and chamber 17 with chambers 19 and 20; for the second position chamber 16 communicates with chamber 17, chamber 20 with chamber 21 and chamber 18 with chamber 19; for the third position chamber 16 communicates with chamber 17, chamber 18 with chamber 21, and chamber 20 with chamber 19; said lower valve disc being formed with a drainage outlet from port $y$ open only when the valve is in the first position, and with a drainage outlet from port $z$ open only when the valve is in the second position.

12. In a valve, the combination of a valve casing provided with a central circular valve chamber and six chambers communicating therewith, a rotary valve member comprising upper and lower discs and webs providing three ports through the valve, means for rotating said valve member, cooperating stop flanges on the valve member and casing for positioning the valve member in its two extreme positions, and a spring latch for holding the valve member in its intermediate position.

ROSWELL P. COOLEY.